US006246162B1

(12) United States Patent
Kahn et al.

(10) Patent No.: US 6,246,162 B1
(45) Date of Patent: Jun. 12, 2001

(54) ION OPTICS

(75) Inventors: James R. Kahn, Ft. Collins; Harold R. Kaufman, LaPorte; Raymond S. Robinson, Fort Collins, all of CO (US)

(73) Assignee: Kaufman & Robinson, Inc., Ft. Collins, CO (US)

( * ) Notice: Subject to any disclaimer, the term of this patent is extended or adjusted under 35 U.S.C. 154(b) by 0 days.

(21) Appl. No.: 09/337,589

(22) Filed: Jun. 21, 1999

(51) Int. Cl.$^7$ ............................... H01J 27/00; F02K 9/00
(52) U.S. Cl. .......................... 313/360.1; 313/268; 60/202
(58) Field of Search ................................ 313/360.1, 268, 313/296, 297, 257, 256

(56) References Cited

U.S. PATENT DOCUMENTS 4,873,467 * 10/1989 Kaufman et al. ................. 313/360.1
5,274,306 12/1993 Kaufman et al. ............... 315/111.41

OTHER PUBLICATIONS

"Ion Source Design for Industrial Applications", AIAA 81–0668R, Kaufman and Robinson, vol. 20, No. 6, Jun. 1982, p. 745 et seq.

* cited by examiner

*Primary Examiner*—Vip Patel
*Assistant Examiner*—Ken A. Berck
(74) *Attorney, Agent, or Firm*—Dean P. Edmundson

(57) ABSTRACT

In one embodiment of the present invention, the ion optics for use with an ion source have first and second electrically conductive grids having mutually aligned respective pluralities of apertures through which ions may be accelerated and wherein each has an integral peripheral portion. There is also a support member. There are first and second series of seats around the respective peripheral portions of the first and second grids. A plurality of first spherical insulators are distributed between seats of the first and second series, thereby establishing a predetermined distance between the grids while still enabling radial movement between their peripheral portions. There are third and fourth series of seats around the support member and the peripheral portion of the second grid, respectively, with seats of the fourth series displaced from those of the second series in the same grid. A plurality of second spherical insulators are distributed between seats of the third and fourth series, thereby establishing a predetermined distance between the support member and the second grid while still enabling motion in at least the radial direction between the support member and the peripheral portion of the second grid. A clamping force between the support member and the peripheral portion of the first grid maintains contact between the insulators and their seats.

9 Claims, 5 Drawing Sheets

ION OPTICS

FIELD OF INVENTION

This invention relates generally to gridded ion sources, and more particularly to the design of ion optics for such ion sources.

This invention can find application in a variety of thin film applications such as etching, sputter deposition, or the property modification of deposited films. It can also find application in space propulsion.

BACKGROUND ART

Gridded ion sources are described in an article by Kaufman, et al., in the AIAA Journal, Vol. 20 (1982), beginning on page 745, which is incorporated herein by reference. The ion sources described therein use a direct-current discharge to generate ions. It is also possible to use a radiofrequency discharge to generate ions, as shown by U.S. Pat. No. 5,274,306—Kaufman et al.

Typical ion optics for gridded ion sources are also described in the aforesaid article by Kaufman, et al. An improved ion optics design is described in U.S. Pat. No. 4,873,467—Kaufman, et al., which as incorporated herein by reference. The problems addressed in this patent are basic to ion optics: need to maintain the apertures in different grids in alignment while the grids and supporting members can vary in temperature, reach different equilibrium temperatures, and, at least for the grids, can have significant temperature variations within a part at equilibrium conditions.

Some specific grid temperatures are given in a chapter by Kaufman in a chapter beginning on page 265 of *Advances in Electronics and Electron Physics*, Vol. 36 (L. Marton, ed.), Academic Press, New York, 1974. The center of the screen grid is typically at 400 to 500° C. during operation, while the center of the accelerator grid is 50 to 100° C. cooler. The edges of the grids operate at 100 to 300° C. cooler than the centers of the grids. Starting operation from ambient temperatures thus involves large temperature differences and gradients.

The temperature differences and variations are aggravated by the poor heat transfer in a vacuum environment, i.e., the heat transfer between parts bolted or riveted together is usually close to the heat transfer that would occur due to radiation alone. For industrial applications of ion sources, it is particularly important that routine assembly not depend on careful hand-eye coordination or the use of expensive and complicated instrumentation.

While the use of a design described in the aforesaid U.S. Pat. No. 4,873,467 is a considerable improvement over prior art in regard to maintaining alignment with varying temperatures, there are still serious problems. Using supporting members of normal flatness tolerances, large clamping forces are required to assure proper contact of parts. These forces are sufficient to plastically deform grids in the contact regions upon which the alignment depends, thereby degrading the precision of that alignment.

In some cases, positive contact of the insulator with adjacent parts is lost at some point in the startup-cooldown thermal cycle, resulting in rotation of that insulator. With a sufficient number of such cycles, a portion of the insulator that is coated with sputtered material can be rotated enough to cause electrical shorting of the ion optics.

SUMMARY OF INVENTION

In light of the foregoing, it is an overall general object of the invention to provide an improved ion optics design that greatly reduces the forces on insulator seats incorporated into ion optics grids and thereby reduces the associated plastic deformation that degrades the alignment precision of apertures through which the ions are accelerated.

Another object of the present invention is to provide a design in which the elastic motion of parts is sufficient to maintain the positive contact of insulators with adjacent parts and thereby prevent the gradual rotation of insulators during repeated thermal cycles and the eventual shorting of the ion optics due to that rotation.

A further object of the present invention is to provide a design that is more adaptable to ion optics configurations having more than two grids.

In accordance with one specific embodiment of the present invention, the ion optics for use with an ion source have first and second electrically conductive grids having mutually aligned respective pluralities of apertures through which ions may be accelerated and wherein each has an integral peripheral portion. There is also a support member. There are first and second mutually aligned series of seats spaced around the respective peripheral portions of the first and second grids. A plurality of first spherical insulators are distributed between corresponding seats of the first and second series, thereby establishing a predetermined distance between the grids while still enabling radial movement between the peripheral portions of the grids relative to each other. There are third and fourth mutually aligned series of seats spaced around the support member and the peripheral portion of the second grid, respectively, with seats of the fourth series displaced from those of the second series in the same grid. A plurality of second spherical insulators are distributed between corresponding seats of the third and fourth series, thereby establishing a predetermined distance between the support member and the second grid while still enabling motion in at least the radial direction between the support member and the peripheral portion of the second grid. A clamping force between the support member and the peripheral portion of the first grid maintains contact between the first plurality of insulators and the first and second grids and between the second plurality of insulators and the support member and the second grid.

BRIEF DESCRIPTION OF FIGURES

Features of the present invention which are believed to be patentable are set forth with particularity in the appended claims. The organization and manner of operation of the invention, together with further objectives and advantages thereof, may be understood by reference to the following descriptions of specific embodiments thereof taken in connection with the accompanying drawings in which:

It may be noted that the aforesaid schematic cross-sectional views represent the surfaces in the plane of the section while avoiding the clutter which would result were there also a showing of the background edges and surfaces of the overall assemblies.

DESCRIPTION OF PRIOR ART

Figure 1:
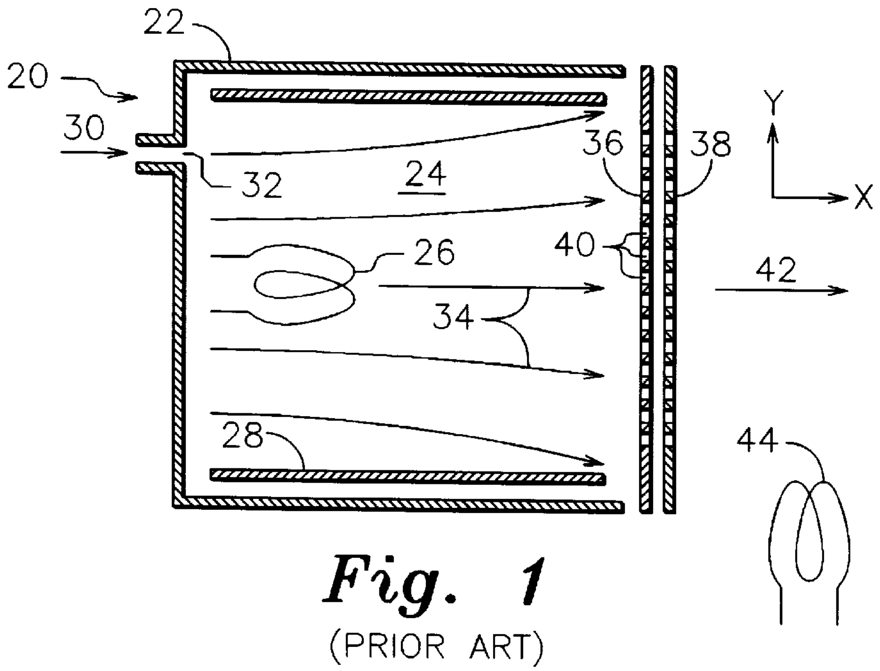
Fig. 1 (PRIOR ART)
FIG. 1 is a schematic cross-sectional view of a prior-art gridded ion source.

Referring to FIG. 1, there is shown a schematic cross section of a prior art gridded ion source 20. There is an outer enclosure 22 that encloses a volume 24. Within this volume is an electron emitting cathode 26 and an annular anode 28. An ionizable gas 30 is admitted to volume 24 through an opening 32. Electrons emitted from cathode 26 are contained by magnetic field 34 and reach anode 28 only after having ionizing collisions with gas atoms or molecules. The electrically conductive gas of ions and electrons that fills most of the volume 24 constitutes a plasma. Some of the ions in this plasma reach the ion optics grids 36 and 38. The ions are formed into beamlets by apertures 40 in the screen grid 36 and are extracted by the negative potential of the accelerator grid 38 and pass through matching apertures therein. The apertures in the screen and accelerator grids are usually circular. The ions continue after passing through the ion optics to form an ion beam 42. The ion beam is charge- and current-neutralized by electrons emitted from the electron emitting neutralizer 44.

The potential difference between the electron emitting cathode 26 and the anode 28 is typically 30 to 40 volts. The ions are formed at approximately the potential of the anode. The energy of the accelerated ions can be adjusted by varying the anode potential relative to ground. The screen grid 36 is either at cathode potential or allowed to electrically float. An enclosure that is exposed to the plasma, as shown in FIG. 1, will also be at either cathode potential or allowed to electrically float. The accelerator grid 38 is operated at a negative potential at least sufficient to keep the electrons from the neutralizer 44 from flowing backwards through the ion optics. The neutralizer is operated at or near ground potential.

Figure 2:
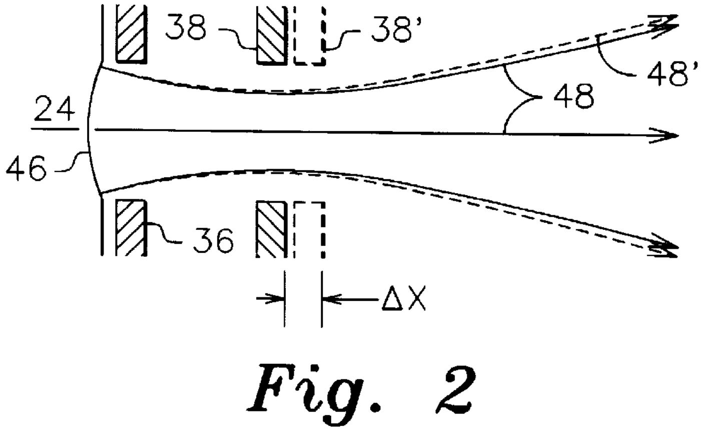
Fig. 2 (PRIOR ART)
FIG. 2 is an enlarged schematic cross-sectional view of a matching pair of ion optics apertures in the prior art ion source of FIG. 1 in which the effect of a longitudinal displacement (the X-direction in FIG. 1) of one grid on ion trajectories is shown.

Referring to FIG. 2, there is shown an enlarged schematic cross-sectional view of a matching pair of ion optics apertures in the prior art ion source of FIG. 1. The boundary between the plasma filling volume 24 and the ion optics is the plasma sheath 46. To the left of the plasma sheath is a quasineutral plasma with approximately equal densities of electrons and ions. The increasingly negative potentials to the right of this sheath reflect electrons and leave essentially only the ions that are accelerated. Ideally, the two apertures are aligned so that the ion beamlet formed by the aperture 40 in the screen grid 36 and indicated by the central and outer ion trajectories 48 passes through the aperture in the accelerator grid 38 without striking that grid.

When evaluating the alignment of a pair of apertures such as those shown in FIG. 2, departures from alignment can be resolved into longitudinal and transverse displacements, i.e., displacements parallel and transverse to the general direction of ion motion, shown respectively as the X and Y directions in FIG. 1. In FIG. 2 the longitudinally displaced accelerator grid location 38' and the displaced ion trajectories 48' are indicated by dashed lines and the size of the longitudinal displacement is shown as $\Delta X$. Depending on the operating condition at the initial location of the accelerator grid 38, a displacement in the longitudinal direction can either enlarge or decrease the beamlet diameter. In general, small longitudinal displacements have little effect on the beamlet shape. This relative insensitivity to longitudinal grid displacement results in a typical ion optics production tolerance of ±0.1 mm for this type of displacement with circular apertures having a diameter of about 2 mm.

Figure 3:
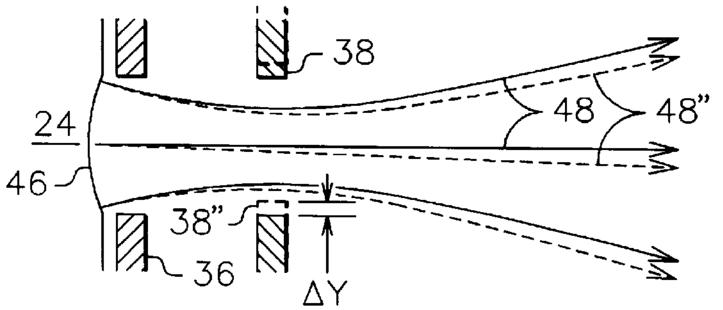
Fig. 3 (PRIOR ART)
FIG. 3 is an enlarged schematic cross-sectional view of a matching pair of ion optics apertures in the prior art ion source of FIG. 1 in which the effect of a transverse displacement (the Y-direction in FIG. 1) of one grid on ion trajectories is shown.

Referring to FIG. 3, there is shown another enlarged schematic cross-sectional view of a matching pair of ion optics apertures in the prior art ion source of FIG. 1. In FIG. 3 the transversely displaced accelerator grid location 38" and the displaced ion trajectories 48" are indicated by dashed lines and the size of the longitudinal displacement is shown as $\Delta Y$. For a transversely displaced accelerator grid 38" the ion beamlet 48" is displaced in the direction opposite to the direction of the grid displacement $\Delta Y$. The-sensitivity to a transverse displacement is approximately one degree of angular displacement for the beamlet 48" for a value of $\Delta Y$ equal to 0.025 to 0.05 mm for aperture diameters of about 2 mm. This relative sensitivity to transverse grid displacement results in a typical ion optics production tolerance of ±0.025 to 0.05 mm for this type of displacement with circular apertures having a diameter of about 2 mm. In practice, machining parts to tolerances of ±0.025 mm is readily achieved, but the tolerance in the assembled grid is degraded from this value for reasons that are inherent in the prior art.

It should be noted that the apertures in grids 36 and 38 can be given a systematic and intentional transverse offset relative to each other to produce a desirable shaping to the overall ion beam. The "alignment" of apertures in two grids would then refer to the agreement with the desired relationship of the apertures, which may or may not include coincident axes for circular apertures.

Figure 4:
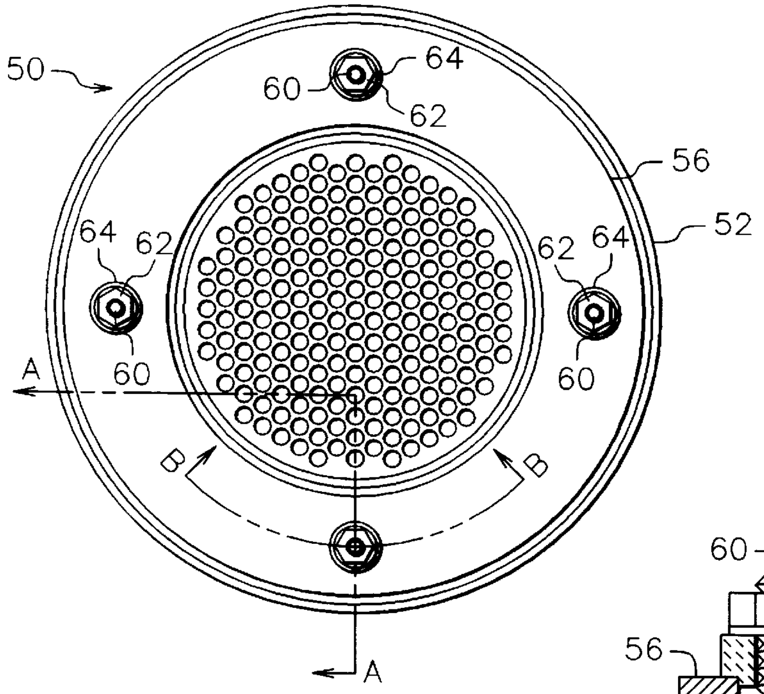
Fig. 4 (PRIOR ART)
FIG. 4 is a front elevation view of a prior art ion optics constructed in accord with U.S. Pat. No. 4,873,467—Kaufman et al.
Figure 5:
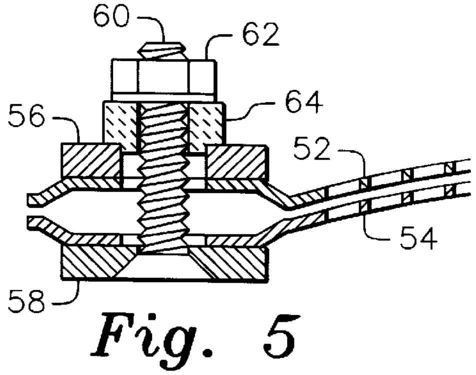
Fig. 5 (PRIOR ART)
FIG. 5 is an enlarged schematic cross-sectional view of the prior art ion optics of FIG. 4 along section A—A, which extends from the peripheral portions of the grids into the apertured regions through which ions are accelerated.

Referring to FIG. 4, there is shown a prior art ion optics 50 constructed in accord with U.S. Pat. No. 4,873,467—Kaufman et al. In FIG. 5 is shown an enlarged schematic cross-sectional view of the prior art ion optics of FIG. 4 along section A—A therein. The ion optics include a first grid 52 (either the screen or accelerator grid), a second grid 54 (the remaining one of the two grids), a first support member 56, a second support member 58, screws 60, nuts 62, and ceramic insulators 64. The screws, nuts, and insulators hold the ion optics together at several locations while, at the same time, keeping the first and second support members 56 and 58 electrically isolated from each other.

The portions of the grids 52 and 54 containing apertures for accelerating the ions are often formed into partial spherical shapes, which provide improved structural stability for those portions. The attachment of the ion optics to the rest of the ion source is not shown in FIGS. 4 and 5 but could be accomplished with screws and insulators to either of the first or second support members. An example of such attachment is shown in the aforementioned U.S. Pat. No. 4,873,467.

Figure 6:
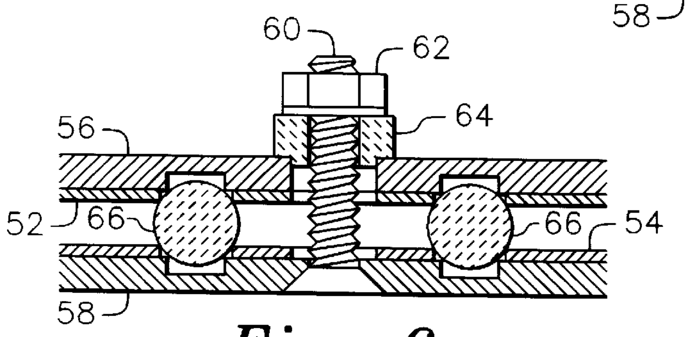
Fig. 6 (PRIOR ART)
FIG. 6 is an enlarged schematic cross-sectional view of the prior art ion optics of FIG. 4 along section B—B in the peripheral portions of those ion optics and the grids therein.
Figure 7:
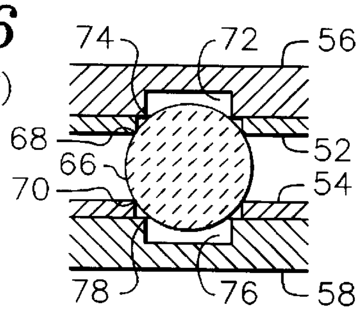
Fig. 7 (PRIOR ART)
FIG. 7 is a further enlarged schematic cross-sectional view of one embodiment of the prior art ion optics of FIG. 6.

FIG. 6 shows an enlarged schematic cross-sectional view of the prior art ion optics of FIG. 4 along section B—B therein. In addition to the parts described above, there are shown spherical insulators 66, typically made of high-strength alumina ($Al_2O_3$), which hold the first and second grids 52 and 54 apart. The details of contact between the spherical insulators and the first and second grids are shown in FIG. 7 which is a further enlarged view of one part of FIG. 6. The spherical insulators 66 extend through openings in the periphery of the first grid 52 and are seated on the edges 68 of that opening, as well as extending through openings in the periphery of the second grid 54 and being seated on the edges 70 of those openings. The spherical insulators 66 further extend into depressions 72 in the first support member 56 and are seated on the edges 74 of those depressions, as well as extend into depressions 76 in the second support member 58 and are seated on the edges 78 of those depressions. The seats in the first and second grids defined bad the edges 68 and 70 and the seats in the first and second support members as defined by the edges 74 and 78 extend both inwardly and outwardly beyond the contact region shown in FIG. 7 in the radial direction from the center of the ion optics shown in FIG. 4. The thermal expansion in circular ion optics is approximately radially symmetric for each of the parts. The radial extensions of these seats therefore permit the relative radial motion of grids to accommodate the relative thermal expansion of the perpheral portions of the grids while keeping the centers of those grids in alignment, in accord with U.S. Pat. No. 4,873,467. Also in accord with that patent, the openings in the grids and the depressions in the support members can be sized so that contact of spherical insulators 66 with edges 68 and 70 is assured before contact takes place with edges 74 and 78.

It should be noted that to properly perform their ion acceleration function the ion optics grids must be constructed of thin material—often only 0.2 to 0.5 mm thick. Grids that are sufficiently thin are also flexible and depart substantially from the required dimensional precision. As described in U.S. Pat. No. 4,873,467, a thick peripheral portion cannot be attached directly to a thin grid without a serious thermal expansion mismatch during startup and cooldown transients. In that patent, the required precision is obtained by pressing the peripheral region of each grid against a flat support member.

The surfaces of the support members 56 and 58 in which the depressions 72 and 76 are located ideally are flat, but have normal fabrication limits on this flatness. The tolerance typically increases with the size of the ion optics and is of the order of ±0.1 mm. Variations in temperature during ion source operation will tend to cause further departures from the ideal. In addition, to assure continuity of the flat surfaces of support members 56 and 58 between the screw, nut, and insulator assemblies shown in FIGS. 5 and 6, the support members 56 and 58 must be stiff structural members.

As the result of these tolerances, temperature variations, and stiffnesses, the experimental force to hold all these parts in contact is typically about 1000 newtons at each screw. This magnitude of force is sufficient to plastically deform the grid material in the region of contact with the alumina spherical insulators 66. The edges 68 and 70 will be deformed until there is sufficient contact area with the spherical insulator to withstand a force of 1000 newtons at each screw, nut, and insulator assembly. In U.S. Pat. No. 4,873,467 there were two screws and one spherical insulator in each assembly. The force per spherical insulator, and therefore the amount of deformation, can be reduced by using one screw and two spherical insulators as shown in FIG. 6. Even with one screw and two spherical insulators, the force sustained per insulator is about 500 newtons. Grids are often made of molybdenum, which has a yield strength of about 500 newtons/$mm^2$. This means that each spherical insulator, made of high-strength alumina, will be pressed into the grids until the contact area between the insulator and each grid is approximately one square millimeter. The edges 68 and 70 of the openings in the grids can-be machined with a precision of ±0.02 mm or better. The deformation under a force of 500 newtons degrades the precision of the transverse grid alignment to ±0.04 mm or more. From the discussions of FIGS. 2 and 3, the transverse alignment (the Y-direction in FIG. 1) is more critical than the longitudinal alignment (the X-direction in FIG. 1), so that it is the transverse alignment that is of primary concern.

With the large forces that are involved, it is easy to damage the edges 68 and 70. For example, these edges can be indented enough to prevent the relative radial motion between grids that is necessary to accommodate thermal expansion.

Figure 8:
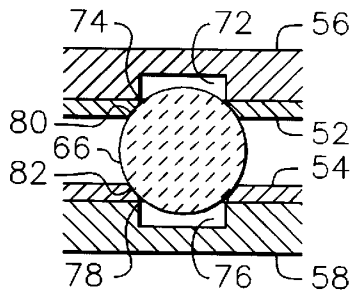
Fig. 8 (PRIOR ART)
FIG. 8 is a further enlarged schematic cross-sectional view of another embodiment of the prior art ion optics of FIG. 6.

Referring to FIG. 8, there is shown a further enlarged view of an alternate embodiment of one part of FIG. 6. In this alternate embodiment the edges 80 and 82 of the openings in the grids 52 and 54 are chamfered to better distribute the contact force between a spherical insulator and a grid. This practical improvement reduces but does not eliminate the plastic deformation in the contact region.

A related problem encountered with the prior art is the rotation of insulators. At some point in a startup, operation, and shutdown thermal cycle, positive contact can be lost between a spherical insulator and adjacent parts. The spherical insulator can then shift its contact points when contact with adjacent parts is re-established. After a large number of thermal cycles, the accumulated rotation can be of the order of 90 degrees. It is difficult to shield an insulator so that sputtered material from the grids and other hardware is completely excluded and, in practice, some accumulation is accepted as normal. However, when the spherical insulator rotates far enough, the sputter deposits on it can move from a relatively benign location to one that causes electrical shorting between the grids, thereby terminating normal operation. With the substantial relative thermal expansion that takes place and the stiffness required to assure flatness for the support members 56 and 58, the rotation of insulators has been a recurring problem.

DESCRIPTION OF THE PREFERRED EMBODIMENT

Figure 9:
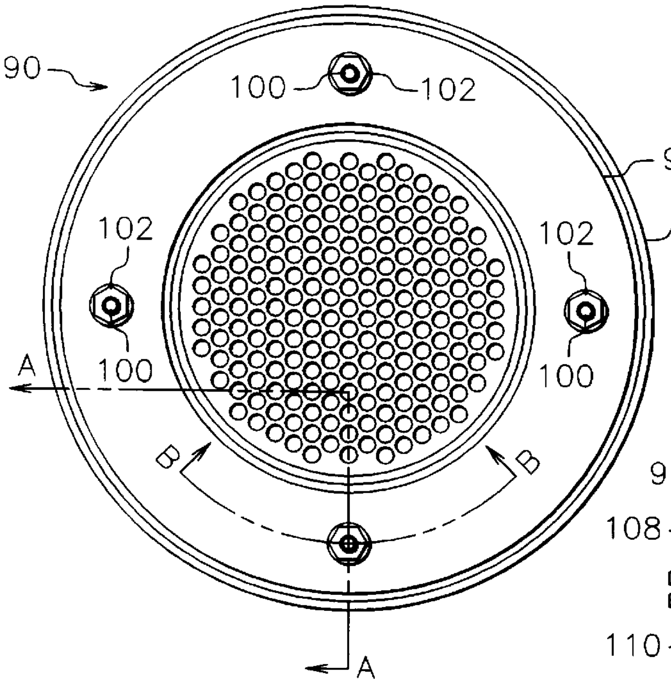
FIG. 9 is a front elevation view of an ion optics constructed in accord with the present invention.
Figure 10:
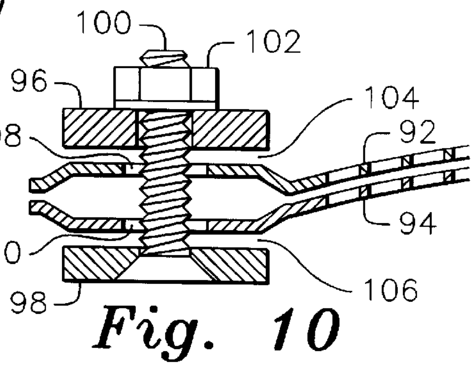
FIG. 10 is an enlarged schematic cross-sectional view of the ion optics of FIG. 9 along section A—A, which extends from the peripheral portions of the grids into the apertured regions through which ions are accelerated.

Referring to FIG. 9, there is shown ion optics 90 constructed in accordance with a specific embodiment of the present invention. In FIG. 10 is shown an enlarged schematic cross-sectional view of the ion optics of FIG. 9 along section A—A therein. This view shows the apertured regions of grids 92 and 94 through which the ions are accelerated as well as the surrounding peripheral regions where the grids are supported and held in alignment. Ion optics 90 includes a first grid 92, a second grid 94, a first support member 96, a second support member 98 screws 100, and nuts 102. The screws and nuts hold the ion optics together. Grids 92 and 94 are separated from support members 96 and 98, both by spaces 104 and 106 and by clearance holes 108 and 110 for screws 100 in grids 92 and 94. This separation permits grids 92 and 94 to be electrically isolated from support members 96 and 98, as well as from each other.

Figure 11:
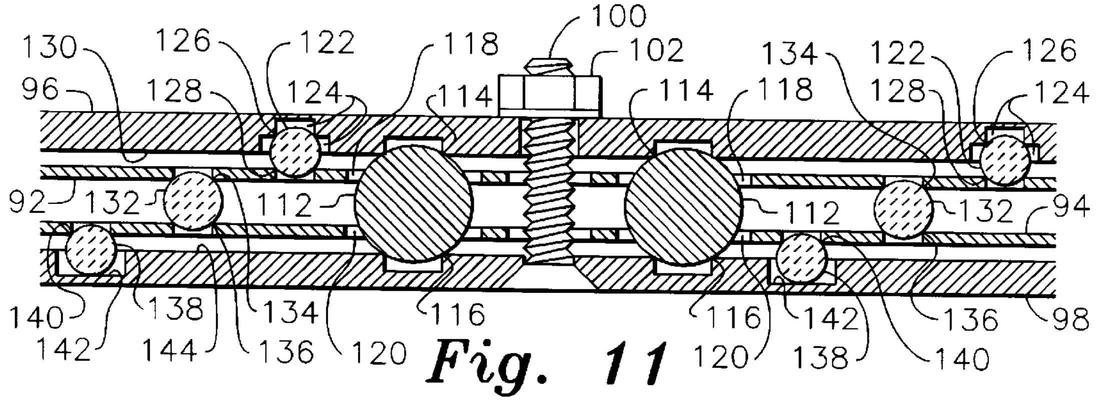
FIG. 11 is an enlarged schematic cross-sectional view of one embodiment of the ion optics of FIG. 9 along section B—B in the peripheral portions of those ion optics and the grids therein.

FIG. 11 shows an enlarged schematic cross-sectional view of the ion optics of FIG. 9 along section B—B therein which passes through grids 92 and 94 in the peripheral portions of those grids. In addition to the parts described above, there are shown spheres 112 which hold apart the first and second support members 96 and 98. Note that the support members 96 and 98 are electrically connected by screws 100, so that spheres 112 can be metallic. Spheres 112 extend into depressions in the first support member 96 and are seated on the edges 114 of these depressions. Spheres 112 also extend into depressions in the second support member 98 and are seated on the edges 116 of these depressions. There are clearance holes 118 and 120 in grids 92 and 94 to avoid contact of spheres 112 with said grids.

Continuing with FIG. 11, the first grid 92 is spaced from the first support member 96 and positioned relative thereto by spherical insulators 122 which penetrate into depressions 124 in said first support member and are seated on edges 126 in said depressions and also penetrate into openings in the first grid 92 and are seated on edges 128 of said openings. The edges 126 are recessed behind the surface 130 of the first support member 96 to provide protection from sputtered material. The separation 104 in FIG. 10 permits sputtered material to approach the spherical insulators 122. If the edges 126 were coplanar with surface 130, sputtered material could make a continuous coating on the insulators 122 from support member 96 to grid 92.

Continuing on with FIG. 11, the second grid 94 is spaced from and located relative to the first grid 92 with spherical insulators 132 which fit into openings in said first and second grids and are seated on edges 134 and 136 of said openings. The second grid is held against insulators 132 with spherical insulators 138 which fit into openings in said second grid and are seated on edges 140 of said openings in addition to extending into depressions in the second support member 98 and being seated against the flat surfaces 142 of said depressions where said surfaces are displaced from and parallel with the surface 144 of said second support member.

The openings and the depressions against which spherical insulators are seated extend both inwardly and outwardly beyond the contact region shown in FIG. 11 in the radial direction from the center of the ion optics shown in FIG. 9. The thermal expansion in circular ion optics is approximately radially symmetric for each of the parts. The extensions of these openings therefore permit relative radial motion to accommodate relative thermal expansion of the peripheral portions of the grids while keeping the centers of these grids in transverse alignment. The peripheral regions of grids 92 and 94 may be formed as shown in FIG. 10 so as to enhance their stiffness and thereby reduce the number of circumferential locations similar to that illustrated in FIG. 11 that are required to adequately support the periphery of a grid.

FIG. 11 is typical of the construction near the nut-bolt assemblies shown in cross sections in FIGS. 10 and 11 and in plan view in FIG. 9. For the complete circumference of ion optics 90 shown in FIGS. 9, 10, and 11, the spherical insulators 122 constitute a plurality. Further these insulators are positioned between two series of seats, which are the edges 126 in the first support member 96 and the edges 128 in the peripheral portion of the first grid. In a similar manner a plurality of spherical insulators 132 are positioned between two series of seats, i.e. the edges 134 and 136, in the peripheral portions of the first and second grids 92 and 94, respectively.

In understanding the construction shown in FIG. 11 it is worth noting that a support function for one grid can be performed by another grid. In the same manner as the first support member 96 provides support for one side of the first grid 92 through spherical insulators 122, the second grid 94 provides support for the other side of the first grid through spherical insulators 132. Grids 92 and 94 are thus each supported from both sides.

There are several features shown in FIG. 11 that depart from prior art:

The transverse alignment of the second support member 98 with the first support member 96 is not critical, inasmuch as the insulators 138 are seated on the flat bottoms 142. Some shift in transverse alignment of the second support member 98 relative to the first support member 96 due to the plastic deformation of edges 114 and 116 is therefore permissible.

The first and second support members 96 and 98 are at the same potential, so that there is no concern about electrical shorts between these two support members due to rotation of spheres 112 during repeated thermal cycles. Spheres 112 could be fabricated of alumina if the high strength of that material were desired, but the insulating capability of alumina is not needed.

The first and second support members 96 and 98 are also shown as having large flat surfaces 130 and 144. While such construction may be convenient, it is not necessary. A variety of shapes could be used as long as the portions of the support members in contact with the spherical insulators 122 and 138 remain unchanged.

The grids 92 and 94 are typically held in location by forces between grids and spherical insulators ranging from about ten newtons to a few tens of newtons. Each grid is held in place by spherical insulators on both sides or surfaces of the grids—e.g. grid 92 is held in place on both sides by spherical insulators 122 and 132 and grid 94 is held in place on both sides by spherical insulators 132 and 138.

The prior-art force of about 1000 newtons was required to assure that the support members in FIGS. 4 through 8 were held in a parallel-plane configuration. A force of about 1000 newtons can be used for each screw 100 in FIGS. 9 through 11, but that force is not. applied to the grids 92 and 94 because of the greater flexibility of the grids compared to that of the support members 96 and 98. Overtightening screws 100 will therefore cause no damage to the edges 126, 134, and 136 upon which the alignment depends.

The peripheral portions of the grids 92 and 94, located between support members 96 and 98, are more flexible than the support members. This means that spherical insulators that are larger than necessary for making contact with the grids can be used while still developing forces of a few tens of newtons. The oversize insulators will cause a slight longitudinal (X-direction in FIG. 1) waviness in the grid location around the grid periphery, but the longitudinal grid location is less critical than the transverse location and the variation around the rim is, to a large extent, averaged out over the portion of a grid containing the apertures for accelerating ions. The oversize insulators and the resultant waviness result in a spring retention of the spherical insulators that will prevent the loss of contact that causes rotation of spherical insulators. The degree of springiness in this retention can be predetermined by the displacement between spherical insulators 122 and 132 and the displacement between spherical insulators 132 and 138. These displacements in FIG. 11 are in the circumferential direction, or angular direction about the center, in FIG. 9, but the displacements could also be in the radial direction. The sizes of these displacements are not critical. The thermal expansion in the length of screws 100 is of the order of 0.1 mm. A wide range of insulator displacements in grids that are only 0.2 to 0.5 mm thick will provide sufficient flexibility to accommodate this amount of thermal expansion.

The most fundamental difference from prior art, however, is that a grid is not supported directly by a support member, but indirectly by that member through insulators at several locations around the ion optics periphery. In addition to the advantages cited above, this permits multiple grids to be held in precise transverse alignment by one support member, e.g., support member 96 in FIG. 11.

ALTERNATE EMBODIMENTS

Figure 12:
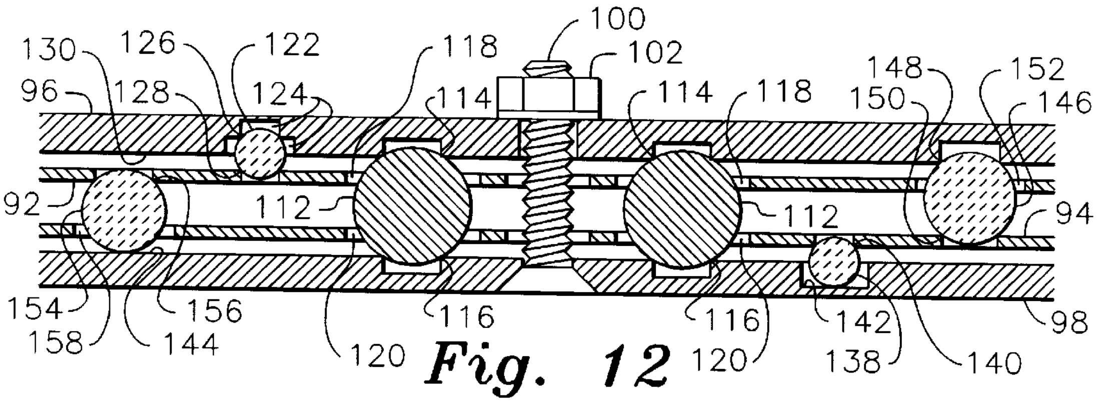
FIG. 12 is an enlarged schematic cross-sectional view of another embodiment of the ion optics of FIG. 9 along section B—B in the peripheral portions of those ion optics and the grids therein.

A variety of alternate embodiments are evident to one skilled in the art. In FIG. 12 is shown an alternate arrangement of spherical insulators that is, at the same time, consistent with FIGS. 9 and 10. In this alternate interpretation of FIGS. 9 and 10, FIG. 12 shows an enlarged schematic cross-sectional view of ion optics 90 of FIG. 9 along section B—B therein. One difference from FIG. 11 is that second grid 94 is held in place by spherical insulators between it and the first support member 96 rather than the first grid 92. This is accomplished by spherical insulators 146 which extend into depressions in the first support member 96 and are seated on the edges 148 of these depressions. The insulators 146 also extend into openings in the second grid 94 and are seated on the edges 150 of these openings, as well as pass through openings 152 in the first grid 92 without touching same.

Another difference of FIG. 12 from FIG. 11 is that the first grid 92 is held in place by spherical insulators between it and the second support member 98 rather than the second grid 94. This is accomplished by spherical insulators 154 which are seated on the flat surfaces 144 of the second support member 98. The insulators 154 also extend into openings in the first grid 92 and are seated on the edges 156 of the openings, as well as pass through openings 158 in the second grid 94 without touching same.

In summary, it is shown in the alternate embodiment of FIG. 12 that each grid can be supported directly from the support members without any insulator being seated simultaneously on the two grids.

Figure 13:
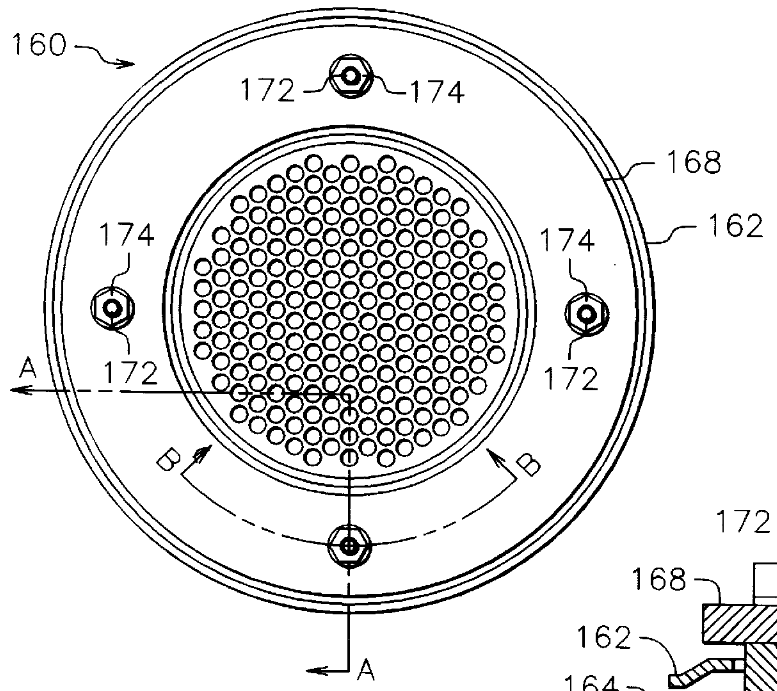
FIG. 13 is a front elevation view of a three-grid ion optics constructed in accord with the present invention.
Figure 14:
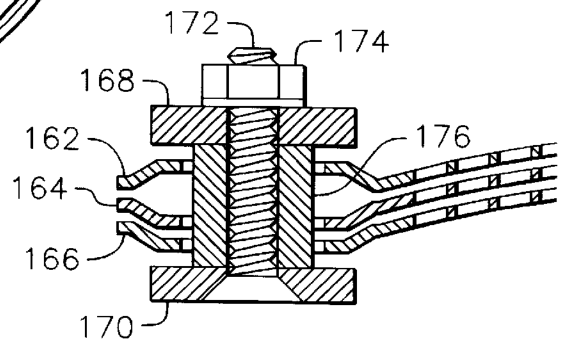
FIG. 14 is an enlarged schematic cross-sectional view of the ion optics of FIG. 13 along section A—A, which extends from the peripheral portions of the grids into the apertured regions through which ions are accelerated.

Referring to FIG. 13, there is shown three-grid ion optics 160 constructed in accord with the present invention. It should be noted that while two-grid optics are most common in industrial ion sources, a greater number of grids may be used for particular applications. FIG. 14 is an enlarged schematic cross-sectional view of ion optics 160 of FIG. 13 along section A—A therein. Ion optics 160 includes a first grid 162, a second grid 164, a third grid 166, a first support member 168, a second support member 170, screws 172, nuts 174, and spacers 176 between the first and second support members. The screws and nuts hold the ion optics together at several locations.

Figure 15:
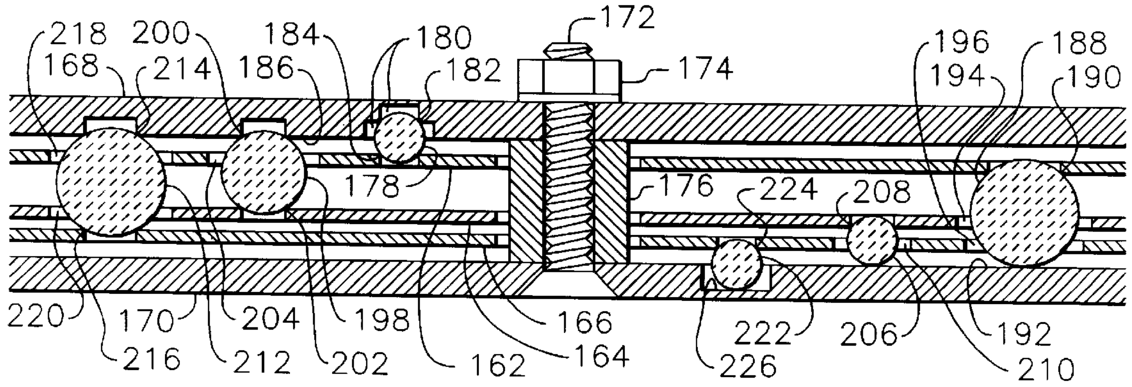
FIG. 15 is an enlarged schematic cross-sectional view of the ion optics of FIG. 13 along section B—B in the peripheral portions of those ion optics and the grids therein.

FIG. 15 is an enlarged schematic cross-sectional view of one embodiment of ion optics 160 of ° FIG. 13 along section B—B therein. In addition to the parts described above, there is shown spherical insulators 178 which penetrate into depressions 180 in first support member 168 and are seated on edges 182 in said depressions and also penetrate into openings in the first grid 162 and are seated on edges 184 of said openings. The edges 182 are recessed behind surface 186 of said first support member to provide shielding of spherical insulators 178 from sputtered particles in the manner described in connection with spherical insulators 122 in FIG. 11. The first grid 162 is supported from the opposite side by spherical insulators 188 which fit into openings in said grid and are seated on edges 190 of said openings and also are seated against surfaces 192 of second support member 170, as well as pass through openings 194 and 196 in the second and third grids 164 and 166 without touching same.

Continuing with FIG. 15, the second grid 164 is spaced from and located relative to the first support member 168 with spherical insulators 198 which fit into depressions in said support member and are seated on edges 200 of said depressions and also penetrate into openings in the second grid 164 and are seated on edges 202 of said openings, as well as pass through openings 204 in the first grid 162 without touching same. The second grid is held from the other side by spherical insulators 206 which fit into openings in said second grid and are seated on edges 208 of said openings and also are seated against surfaces 192 of second support member 170, as well as pass through openings 210 in the third grid.

Continuing on with FIG. 15, the third grid 166 is spaced from and located relative to the first support member 168 with spherical insulators 212 which fit into depressions in said support member and are seated on edges 214 of said depressions and also penetrate into openings in the third grid 166 and are seated on edges 216 of said openings, as well as pass through openings 218 and 220 in the first and second grids 162 and 164 without touching same. The third grid is held from the other side by spherical insulators 222 which fit into openings in said third grid and are seated on edges 224 of said openings and also penetrate into depressions in second support member 170 and are seated on surfaces 226 of said depressions, where said surfaces are parallel to surface 192 of the second support member.

The openings and the depressions against which spherical insulators seat extend both inwardly and outwardly beyond the contact region shown in FIG. 15 in the radial direction from the center of ion optics 160 shown in FIG. 13. These extensions permit relative radial motion to accommodate relative thermal expansion of the peripheral portions of the grids while keeping the centers of those grids in transverse alignment.

It is shown in FIGS. 13 through 15 that three grids can be supported with the same advantages shown for the preferred embodiment using two grids. Further, those skilled in the art should recognize that subject invention can be adapted to a larger number of grids, if desired.

In another departure from the configurations described, the different grids could be supported at different radii, instead of all insulators and all support being at essentially one radius from the ion optics center.

Figure 16:
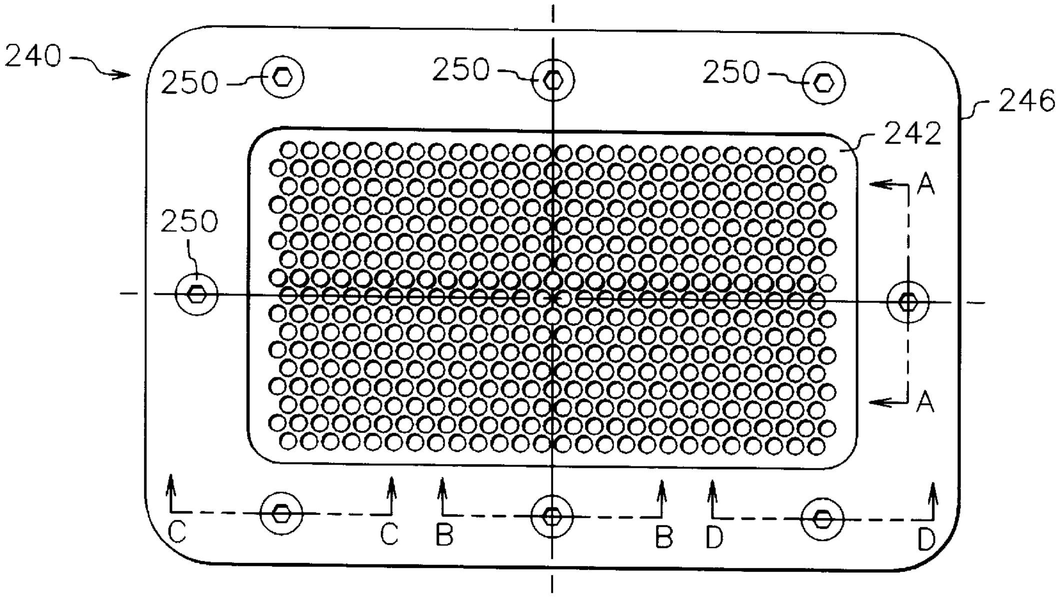
FIG. 16 is front elevation view of a rectangular ion optics constructed in accord with the present invention.
Figure 17:
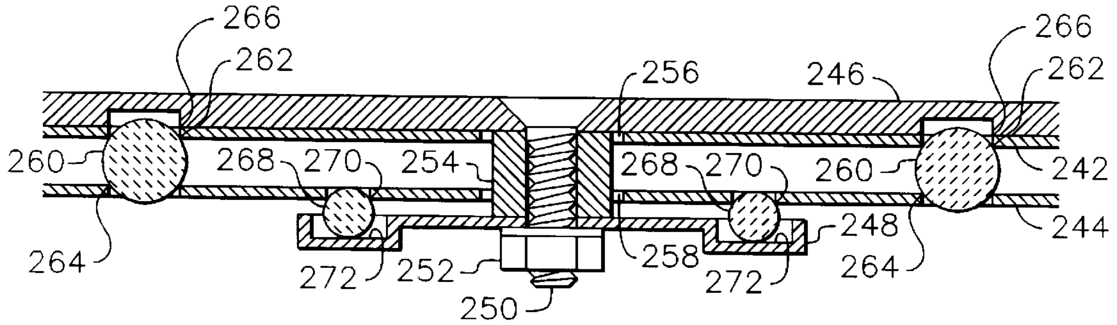
FIG. 17 is an enlarged schematic cross-sectional view of the ion optics of FIG. 16 along either section A—A or section B—B in the peripheral portions of those ion optics and the grids therein.

Noncircular ion optics could also employ this invention, preferably with locations close to the planes of symmetry for the insulators used for transverse alignment of the grids. In FIG. 16 is a rectangular ion optics constructed in accord with the present invention. FIG. 17 is an enlarged schematic cross-sectional view of ion optics 240 of FIG. 16 along either section A—A or section B—B therein. Ion optics 240 includes a first grid 242, a second grid 244, a first support member 246, a plurality of second support members 248, screws 250, nuts 252, and spacers 254. The screws and nuts hold ion optics 240 together at several locations. There are openings 256 and 258 in grids 242 and 244 that are sized so that spacers 254 can pass through said grids without touching same.

Note that the plurality of support members constitutes a support means, rather than a support member. In addition, the construction shown in FIGS. 11, 12, 14, and 15 has implied a fixed spacing between first and second support members, where that spacing has been selected to give adequate spring retention to the insulators in their seats while at the same time not causing excessive force that might damage the grids or the seats therein. In FIG. 17 the second support members 248 are indicated as being thin and therefore able to flex. In the construction shown in FIGS. 17, then, it would be appropriate to describe the support members 248 as providing a force sufficient to retain insulators in their seats. Providing a fixed spacing that results in an adequate force is considered functionally equivalent to providing a fixed force that results in an acceptable spacing.

Continuing with FIG. 17, the first grid 242 is spaced from the second grid 244 and positioned relative thereto by spherical insulators 260 which penetrate openings in the first grid and are seated on edges 262 therein and also penetrate into openings in the second grid 244 and are seated on edges 264 of said openings. The insulators 260 also penetrate into depressions in support member 246, with said depressions having edges 266. The depressions in the support member are sized so that the edges 262 in the openings in grid 242 are contacted by insulators 260 before the edges 266 of the depressions in support member 246 are contacted. This sequence of contact assures that contact of insulators 260 with the support member 246 will not degrade the transverse alignment of grids 242 and 244. The second grid is held against insulators 260 with spherical insulators 268 which fit into openings in said second grid and are seated on edges 270 of said openings and also extend into depressions in the second support members 248 and press against surfaces 272 of said depressions where said surfaces are displaced from and approximately parallel with the first support member 246.

The openings in grids 242 and 244 and the depressions in support member 246 against which spherical insulators 260 and 268 are seated extend both inwardly and outwardly beyond the contact region shown in FIG. 17 in the radial direction from the center of ion optics 240 shown in FIG. 16. These extensions permit relative radial motion to accommodate relative thermal expansion of the grids while keeping the centers of these grids in transverse alignment.

Figure 18:
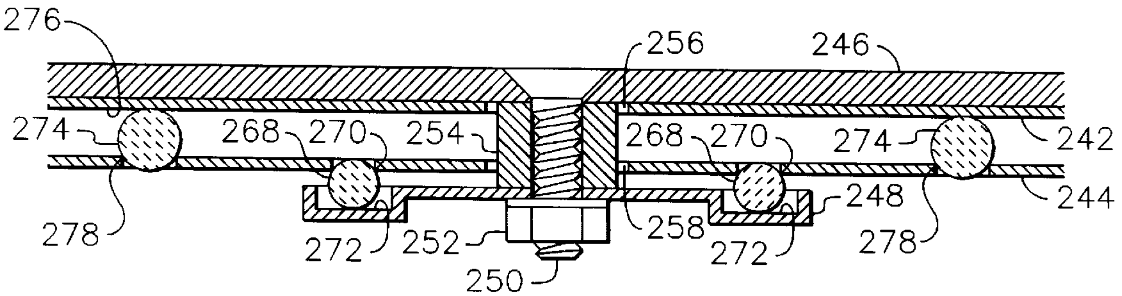
FIG. 18 is an enlarged schematic cross-sectional view of the ion optics of FIG. 16 along either section C—C or D—D also in the peripheral portions of those ion optics and the grids therein.

Referring to FIG. 18, therein is shown an enlarged schematic cross-sectional view of ion optics 240 of FIG. 16 along either section C—C or D—D therein. FIG. 18 differs from FIG. 17 in that the first grid 242 is spaced from the second grid 244 by spherical insulators 274 which seat against surface 276 of first grid 242 and also penetrate into openings in the second grid 244 and seat on edges 278 of said openings.

In FIG. 17 both the transverse and longitudinal alignment of grids 242 and 244 is assured by the construction therein. In FIG. 18 only the longitudinal alignment is assured. This difference in construction is necessary to keep the centers of grids 242 and 244 in alignment while preventing the possible interference that could result from the non-axially symmetric thermal expansion of a rectangular shape together with trying to maintain transverse alignment from too many peripheral locations. Instead, transverse alignment is obtained only from locations near the two axes of symmetry.

In addition to the departure from a circular beam, the alternate embodiment shown in FIGS. 16 through 18 uses a number of separate parts to perform the function of what is a single second support member in the other embodiments.

Those skilled in the art will recognize that while spherical insulators are well suited for use in this invention, cylindrical insulators would work almost as well. In a similar manner, spherical insulators contact seats that are the edges of openings in grids, but indentations in grids could also have been used as the seats for these insulators.

Those skilled in the art will also recognize that while circular apertures are described herein for the acceleration of ions, it is possible and sometimes desirable to use noncircular apertures for this purpose.

While particular embodiments of the present invention have been shown and described, and various alternatives have been suggested, it will be obvious to those of ordinary skill in the art that changes and modifications may be made without departing from the invention in its broadest aspects. Therefore, the aim in the appended claims is to cover all such changes and modifications as fall within the true spirit and scope of that which is patentable.

We claim:

1. Ion optics for use with an ion source comprising:

first and second electrically conductive spaced-apart grids having mutually aligned respective pluralities of apertures through which ions may be accelerated and wherein each grid includes an integral peripheral portion;

a support member;

a support means;

first and second series of opposing and mutually aligned seats spaced around said support member and said peripheral portion of said first grid, respectively;

means, including a plurality of first insulators each having a circular cross section, positioned between said support member and said first grid, and individually seated in and between ones of said first and second series of seats, for establishing a predetermined spacing and the only points of support between said support member and said first grid and for enabling relative motion in the radial direction between said support member and said peripheral portion of said first grid;

a third and fourth series of opposing and mutually aligned seats spaced around said support means and the peripheral portion of said first grid, respectively, wherein the seats of said fourth series in said first grid are displaced from the seats of said second series;

means, including a plurality of second insulators each having a circular cross section, positioned between said first grid and said support means, and individually seated in and between ones of said third and fourth series of seats, for establishing a predetermined spacing and the only points of support between said support means and said first grid and for enabling relative motion in at least the radial direction between said support means and said peripheral portion of said first grid;

means for providing sufficient force between said support member and said support means to maintain contact between said first insulators and said support member and said peripheral portions of said first grid and to maintain contact between said second insulators and said support means and said peripheral portion of said first grid; and wherein the flexibility of said peripheral portion of said first grid is greater than that of said support member; and wherein said peripheral portion of said first grid exhibits springiness between the seats of said second and fourth series.

2. Ion optics for use with an ion source comprising:

first and second electrically conductive grids having mutually aligned respective pluralities of apertures through which ions may be accelerated and wherein each grid includes an integral peripheral portion;

a support means;

first and second series of opposing and mutually aligned seats spaced around the respective peripheral portions of said first and second grids;

means, including a plurality of first insulators each having a circular cross section, positioned between said first and second grids, and individually seated in and between ones of said first and second series of seats, for establishing a predetermined spacing and the only points of support between said grids and for enabling relative radial movement between said peripheral portions of said grids;

a third and fourth series of opposing and mutually aligned seats spaced around said support means and the peripheral portion of said second grid, wherein the seats of said fourth series in said second grid are displaced from the seats of said second series;

means, including a plurality of second insulators each having a circular cross section, positioned in and between said second grid and said support means, and individually seated in and between ones of said third and fourth series of seats, for establishing a predetermined spacing and the only points of support between said support means and said second grid and for enabling relative motion in at least the radial direction between said support means and said peripheral portion of said second grid;

means for providing sufficient force between said support means and said peripheral portion of said first grid to maintain contact between said first insulators and said peripheral portions of said first and second grids and to maintain contact between said second insulators and said support means and said peripheral portion of said second grid; and wherein the flexibility of said peripheral portion of said second grid is greater than that of said support means; and wherein said peripheral portion of said second grid exhibits springiness between the seats of said second and fourth series.

3. Ion optics for use with an ion source comprising:

first and second electrically conductive grids having mutually aligned respective pluralities of apertures through which ions may be accelerated and wherein each grid includes an integral peripheral portion;

a support member in contact with the peripheral portion of said first grid on the side of said first grid facing away from said second grid;

a support means;

first and second series of opposing and mutually aligned seats spaced around the respective peripheral portions of said first and second grids;

means, including a plurality of first insulators each having a circular cross section, positioned between said first and second grids, and individually seated in and between ones of said first and second series of seats, for establishing a predetermined spacing and the only points of support between said grids and for enabling radial movement between said peripheral portions of said grids relative to each other;

third and fourth series of opposing and mutually aligned seats spaced around said support means and the peripheral portion of said second grid, wherein the seats of said fourth series in said second grid are displaced from the seats of said second series;

means, including a plurality of second insulators each having a circular cross section, positioned between said second grid and said support means, and individually seated in and between ones of said third and fourth series of seats, for establishing a predetermined spacing and the only points of support between said support means and said peripheral portion of said second grid and for enabling relative motion in at least the radial direction between said support means and said peripheral portion of said second grid;

means for providing sufficient force between said support member and said support means to maintain contact between said support member and said peripheral portion of said first grid, said first insulators and said peripheral portions of said first and second grids, and said second insulators and said support means and said peripheral portion of said second grid; and wherein the flexibility of said peripheral portion of said second grid is greater than that of said support means; and wherein said peripheral portion of said second grid exhibits springiness between the seats of said second and fourth series.

4. Ion optics for use with an ion source comprising:

first and second electrically conductive grids having mutually aligned respective pluralities of apertures through which ions may be accelerated and wherein each grid includes an integral peripheral portion;

a support member;

a support means;

first and second series of opposing and mutually aligned seats spaced around said support member and said peripheral portion of said first grid;

means, including a plurality of first insulators each having a circular cross section, positioned between said support member and said first grid, and individually seated in and between ones of said first and second series of seats, for establishing a predetermined spacing and the only points of support between said support member and said first grid and for enabling relative motion in at least the radial direction between said support member and said peripheral portion of said first grid;

third and fourth series of opposing and mutually aligned seats spaced around the respective peripheral portions of said first and second grids, wherein the seats of said third series in said first grid are displaced from the seats of said second series;

means, including a plurality of second insulators each having a circular cross section, positioned between said first and second grids, and individually seated in and between ones of said third and fourth series of seats, for establishing a predetermined spacing and the only points of support between said grids and enabling relative radial movement between said peripheral portions of said grids;

a fifth and sixth series of opposing and mutually aligned seats spaced around said support means and the peripheral portion of said second grid, wherein the seats of said sixth series in said second grid are displaced from the seats of said fourth series;

means, including a plurality of third insulators each having a circular cross section, positioned between said second grid and said support means, and individually seated in and between ones of said fifth and sixth series of seats, for establishing a predetermined distance and the only points of support between said support means and said second grid and for enabling relative motion in at least the radial direction between said second grid and support means;

means for providing sufficient force between said support member and said support means to maintain contact between said first insulators and said support member and said peripheral portion of said first grid, said second insulators and said peripheral portions of said first and second grids, and said third insulators and said support means and said peripheral portion of said second grid; and wherein the flexibility of said peripheral portions of each said first and second grids is greater than that of said support member and wherein said peripheral portions of said first and second grids exhibit springiness between the seats of said second and fourth series and between the seats of said fourth and sixth series, respectively.

5. Ion optics for use with an ion source comprising:

first and second electrically conductive grids having mutually aligned respective pluralities of apertures through which ions may be accelerated and wherein each grid includes an integral peripheral portion;

a support member;

a support means;

first and second series of opposing and mutually aligned seats spaced around said support member and said peripheral portion of said first grid;

means, including a plurality of first insulators each having a circular cross section, positioned between said support member and said first grid, and individually seated in and between ones of said first and second series of seats, for establishing a predetermined spacing between said support member and said first grid and for enabling relative motion in the radial direction between said support member and said peripheral portion of said first grid;

a third and fourth series of opposing and mutually aligned seats spaced around said support means and the peripheral portion of said first grid, wherein the seats of said fourth series in said first grid are displaced from the seats of said second series;

means, including a plurality of second insulators each having a circular cross section, positioned between said first grid and said support means, and individually seated in and between ones of said third and fourth series of seats, for establishing a predetermined distance between said support means and said first grid and for enabling relative motion in at least the radial direction between said first grid and said support means;

first series of openings in said peripheral portion of said second grid sized so as to enable said second insulators to extend through said peripheral portion without touching same;

fifth and sixth series of opposing and mutually aligned seats spaced around said support member and said peripheral portion of said second grid wherein said fifth series of seats are displaced from said first series of seats in said support member;

means, including a plurality of third insulators each having a circular cross section, positioned between said support member and said second grid, and individually seated in and between ones of said fifth and sixth series of seats, for establishing a predetermined spacing between said support member and said second grid and for enabling relative motion in the radial direction between said support member and said peripheral portion of said second grid;

a second series of openings in said peripheral portion of said first grid sized so as to enable said third insulators to pass through said peripheral portion without touching same and displaced from said second series of seats in said first grid;

a seventh and eighth series of opposing and mutually aligned seats spaced around said support means and the peripheral portion of said second grid, wherein the seats of said eighth series in said second grid are displaced from the seats of said sixth series and the openings of said first series;

means, including a plurality of fourth insulators each having a circular cross section, positioned between said second grid and said support means, and individually seated in and between ones of said seventh and eighth series of seats, for establishing a predetermined distance between said support means and said second grid and for enabling relative motion in at least the radial direction between said second grid and said support means; and means for providing sufficient force between said support member and said support means to maintain contact between said first insulators and said first and second series of seats, said second insulators and said third and fourth series of seats, said third insulators and said fifth and sixth series of seats, and said fourth insulators and said seventh and eighth series of seats.

6. Ion optics as defined in claims 1, 2, 3, 4 or 5 further comprising a third electrically conductive grid having a plurality of apertures mutually aligned with said apertures in said first and second grids and being spaced from said first and second grids.

7. Ion optics for use with an ion source comprising:

first and second electrically conductive spaced-apart grids having mutually aligned respective pluralities of apertures through which ions may be accelerated and wherein each grid includes an integral peripheral portion;

a support member;

a support means;

first and second series of opposing and mutually aligned seats spaced around said support member and said peripheral portion of said first grid, respectively;

means, including a plurality of first insulators each having a circular cross section, positioned between said support member and said first grid, and individually seated in and between ones of said first and second series of seats, for establishing a predetermined spacing and the only points of support between said support member and said first grid and for enabling relative motion in the radial direction between said support member and said peripheral portion of said first grid;

a third and fourth series of opposing and mutually aligned seats spaced around said support means and the peripheral portion of said first grid, respectively, wherein the seats of said fourth series in said first grid are displaced from the seats of said second series;

means, including a plurality of second insulators each having a circular cross section, positioned between said first grid and said support means, and individually seated in and between ones of said third and fourth series of seats, for establishing a predetermined spacing and the only points of support between said support means and said first grid and for enabling relative motion in at least the radial direction between said first grid and said support means;

a series of openings in said peripheral portion of said second grid sized so as to enable said second insulators to extend through said peripheral portion of said second grid without touching same; and means for providing sufficient force between said support member and said support means to maintain contact between said first insulators and said first and second series of seats, said second insulators and said third and fourth series of seats.

8. Ion optics for use with an ion source comprising:

first and second electrically conductive grids having mutually aligned respective pluralities of apertures through which ions may be accelerated and wherein each grid includes an integral peripheral portion;

a support member;

a support means;

first and second series of opposing and mutually aligned seats spaced around said support member and said peripheral portion of said first grid;

means, including a plurality of first insulators each having a circular cross section, positioned between said support member and said first grid, and individually seated in and between ones of said first and second series of seats, for establishing a predetermined spacing and the only points of support between said support member and said first grid and for enabling relative motion in the radial direction between said support member and said peripheral portion of said first grid;

a third and fourth series of opposing and mutually aligned seats spaced around said support means and the peripheral portion of said first grid, wherein the seats of said fourth series in said first grid are displaced from the seats of said second series;

means, including a plurality of second insulators each having a circular cross section, positioned between said first grid and said support means, and individually seated in and between ones of said third and fourth series of seats, for establishing a predetermined distance and the only points of support between said support means and said first grid and for enabling relative motion in at least the radial direction between said first grid and said support means;

a series of first openings in said peripheral portion of said second grid sized so as to enable said second insulators to extend through said peripheral portion of said second grid without touching same;

means for providing sufficient force between said support member and said support means to maintain contact between said first insulators and said first and second series of seats, said second insulators and said third and fourth series of seats;

fifth and sixth series of opposing and mutually aligned seats spaced around said support member and said support means wherein said fifth series of seats are displaced from said first series of seats in said support member and wherein said sixth series of seats are displaced from said third series of seats in said support means;

means, including a plurality of spacers each having a circular cross section, positioned between said support member and said support means, and individually seated in and between ones of said fifth and sixth series of seats, for establishing a predetermined distance between said support member and said support means, for enabling relative motion in at least the radial direction between said support member and said support means, and for preventing excessive deflection and inelastic deformation of said first grid;

a series of second openings in said peripheral portion of said first grid sized so as to enable said spacers to extend through said peripheral portion without touching same, wherein said first openings are displaced from said seats of said second series and said fourth series; and a series of third openings in said peripheral portion of said second grid sized so as to enable said spacers to extend through said peripheral portion without touching same, wherein said second openings are displaced from said first openings.

9. Ion optics for use with an ion source comprising:

first and second electrically conductive grids having mutually aligned respective pluralities of apertures through which ions may be accelerated and wherein each grid includes an integral peripheral portion;

a support member;

a support means;

first and second series of opposing and mutually aligned seats spaced around said support member and said peripheral portion of said first grid;

means, including a plurality of first insulators each having a circular cross section, positioned between said support member and said first grid, and individually seated in and between ones of said first and second series of seats, for establishing a predetermined spacing and the only points of support between said support member and said first grid and for enabling relative motion in at least the radial direction between said support member and said peripheral portion of said first grid;

third and fourth series of opposing and mutually aligned seats spaced around the respective peripheral portions of said first and second grids, wherein the seats of said third series in said first grid are displaced from the seats of said second series;

means, including a plurality of second insulators each having a circular cross section, positioned between said first and second grids, and individually seated in and between ones of said third and fourth series of seats, for establishing a predetermined spacing and the only points of support between said grids and enabling relative radial movement between said peripheral portions of said grids;

a fifth and sixth series of opposing and mutually aligned seats spaced around said support means and the peripheral portion of said second grid, wherein the seats of said sixth series in said second grid are displaced from the seats of said fourth series;

means, including a plurality of third insulators each having a circular cross section, positioned between said second grid and said support means, and individually seated in and between ones of said fifth and sixth series of seats, for establishing a predetermined distance and the only points of support between said support means and said second grid and for enabling relative motion in at least the radial direction between said second grid and said support means;

means for providing sufficient force between said support member and said support means to maintain contact between said first insulators and support member and said peripheral portion of said first grid, said second insulators and said peripheral portions of said first and second grids, and said third insulators and said support means and said peripheral portion of said second grid;

seventh and eighth series of opposing and mutually aligned seats spaced around said support member and said support means wherein said seventh series of seats are displaced from said first series of seats in said support member and wherein said eighth series of seats are displaced from said fifth series of seats in said support means;

means, including a plurality of spacers each having a circular cross section, positioned between said support member and said support means, and individually seated in and between ones of said seventh and eighth series of seats, for establishing a predetermined distance between said support member and said support means, for enabling relative motion in at least the radial direction between said support member and said support means, and for preventing excessive deflection and inelastic deformation of said first and second grids;

a series of first openings in said peripheral portion of said first grid sized so as to enable said spacers to extend through said peripheral portion without touching same, wherein said first openings are displaced from said seats of said second series and said third series; and a series of second openings in said peripheral portion of said second grid sized so as to enable said spacers to extend through said peripheral portion without touching same, wherein said second openings are displaced from said seats of said fourth series and said sixth series.

* * * * *